United States Patent
Keshavaraj (10) Patent No.: US 6,930,065 B2
(45) Date of Patent: *Aug. 16, 2005

(54) FABRIC BLANK FOR MULTI-SEGMENT AIR BAG TETHER CONSTRUCTION

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/152,953

(22) Filed: May 21, 2002

(65) Prior Publication Data

US 2002/0135173 A1 Sep. 26, 2002

Related U.S. Application Data

(62) Division of application No. 09/711,418, filed on Nov. 13, 2000, now Pat. No. 6,733,037.

(51) Int. Cl.[7] ........................... D03D 15/00; B60R 21/16
(52) U.S. Cl. .................... 442/208; 280/728.1; 280/733; 280/736; 280/743.1; 280/743.2
(58) Field of Search ....................... 442/208; 280/743.2, 280/728.1, 733, 736, 743.1, 743

(56) References Cited

U.S. PATENT DOCUMENTS

| | | | |
|---|---|---|---|
| 4,966,389 A | 10/1990 | Takada | |
| 5,165,716 A | 11/1992 | Imai et al. | 280/730 |
| 5,308,113 A | 5/1994 | Moriset | |
| 5,378,011 A | 1/1995 | Rogerson et al. | 280/728 R |
| 5,393,092 A | 2/1995 | Charns et al. | 280/743 R |
| 5,607,183 A | 3/1997 | Nishimura et al. | 280/743.2 |
| 5,613,708 A | 3/1997 | Bleider et al. | 280/743.2 |
| 5,669,632 A | 9/1997 | Johnson et al. | 280/743.2 |
| 5,813,696 A | 9/1998 | Hill | |
| 5,848,805 A | 12/1998 | Sogi et al. | 280/743.2 |
| 5,997,037 A | 12/1999 | Hill et al. | |
| 6,086,096 A | 7/2000 | Link et al. | 280/743.2 |
| 6,241,283 B1 | 6/2001 | Zarazua | |
| 6,254,130 B1 | 7/2001 | Jayaraman et al. | |
| 6,302,433 B1 | 10/2001 | Ellerbrok et al. | |
| 6,315,324 B1 | 11/2001 | Keshavaraj | |
| 6,733,037 B1 * | 5/2004 | Keshavaraj | 280/743.2 |
| 6,783,155 B2 * | 8/2004 | Keshavaraj | 280/743.2 |
| 6,796,583 B2 * | 9/2004 | Keshavaraj | 280/743.2 |
| 2001/0030418 A1 * | 10/2001 | Keshavaraj | 280/743.2 |
| 2003/0034637 A1 | 2/2003 | Wang et al. | 280/729 |

FOREIGN PATENT DOCUMENTS

| | | |
|---|---|---|
| EP | 0 611 683 | 8/1994 |
| GB | 2 243 119 | 3/1990 |
| GB | 2261855 | 2/1993 |

* cited by examiner

*Primary Examiner*—Arti R. Singh
(74) *Attorney, Agent, or Firm*—Terry T. Moyer; Charlotte C. Wilson (57) ABSTRACT

The present invention relates to air bag tethers and to a pattern-wise arrangement of such tethers in relation to air bag panels on a fabric blank. In one embodiment, the front tether panel is comprised of two or more tether segments that cut in alignment with the warp and the fill of the fabric blank, while the rear tether panel is comprised of two or more tether segments that are cut on the bias with respect to the warp and the fill of the fabric blank. The front and rear tether panels are then connected to one another to form a functional tether system. This multiple-segment construction, with its bias-cut segments, decreases the amount of fabric that is used in the manufacture of the air bag and tethers, while providing sufficient elongation for the tether system to be functional.

4 Claims, 7 Drawing Sheets

FABRIC BLANK FOR MULTI-SEGMENT AIR BAG TETHER CONSTRUCTION

CROSS-REFERENCE TO RELATED APPLICATIONS

This application is a divisional application of U.S. patent application Ser. No. 09/711,418, now U.S. Pat. No. 6,733,037 filed Nov. 13, 2000 and entitled MULTI-SEGMENT AIR BAG TETHER CONSTRUCTION.

TECHNICAL FIELD

This disclosure relates to air bag tethers and to a pattern-wise arrangement of such tethers in relation to air bag panels on a fabric blank, thus resulting in increased fabric utilization and an overall cost savings per finished air bag. The air bag tether system as described herein is comprised of two multi-segment congruent tether panels that are joined to one another and to a respective air bag panel. In one embodiment, the segments that comprise the tether panel that is attached to the front panel of the air bag are cut in alignment with the warp and the fill of the fabric blank. The segments that comprise the rear tether panel are cut on the bias with respect to the warp and the fill of the fabric blank. This two-panel construction, with its bias-cut segments, decreases the amount of fabric that is used in the manufacture of the air bag and tethers, while providing sufficient elongation for the tether system to be functional.

BACKGROUND

Traditionally, air bag tethers have been used to control the excursion of an air bag as it inflates. As gas is released, causing the air bag to rapidly inflate, it is necessary to keep such inflation from occurring in an uncontrolled manner. Tethers, which are sewn to the front and rear panels of an air bag, keep the inflating air bag from expanding so rapidly as to adversely affect the safety of the vehicle occupant, as the vehicle occupant contacts the air bag.

Tethers are conventionally strip-shaped pieces of fabric that are aligned in pattern-wise arrangement on a fabric blank, or that are aligned in relation to air bag panels that may be cut from the same blank. The patterns for these tethers may include a circular portion in the center area of the tether strip around which the strip is attached to the air bag panel. It is understood in the industry that such tethers should have a capacity for elongation (that is, the tethers should be able to stretch to accommodate the rapid excursion of the bag). For this reason, conventional tethers have been cut on the bias with respect to the warp and fill of the fabric. However, aligning the tether patterns to meet this criterion increases the amount of fabric needed to create an appropriate number of tethers for a plurality of air bags. Furthermore, because fabric utilization comprises more than fifty percent of the costs of a finished air bag, aligning the tethers in this manner increases production costs.

SUMMARY

The present air bag tether system addresses the problems of fabric utilization and tether elongation. By understanding that the portions of the tether that are connected to the rear panel typically experience a greater level of stretch than the tether portions connected to the front panel, a fabric-saving solution was created. Instead of the entire tether length being cut on the bias, only those segments of the tether attached to the rear panel are cut on the bias. Using a multi-segment tether system in which only the rear tether panels are cut on the bias increases fabric utilization by allowing these bias-cut tether segments to be arranged around air bag panels into spaces which otherwise be considered fabric waste. The segments of the tether that are attached to the front panel are cut in alignment with the warp and fill of the fabric. The combination of the bias-cut and alignment-cut tether segments leads to an improved fabric utilization, while providing a tether system that is capable of sustaining the forces exerted by the inflating air bag.

DETAILED DESCRIPTION

In order to describe the invention, it is necessary that certain terms be defined. The term "bias" is intended to refer to a cut diagonally across the weave of a fabric, preferably at an angle of 25 to 65 degrees with respect to the warp and fill. The term "front" shall refer to that portion of an air bag that is nearest a vehicle occupant, while the term "rear" shall refer to those portions of an air bag that are furthest from the vehicle occupant (e.g., in the case of front-seat air bags, nearest the windshield). The term "tether" shall refer to a strip-shaped piece of fabric utilized to prevent the uncontrolled excursion of an inflating air bag from adversely affecting a vehicle occupant with whom such a bag comes into contact. Typically, two tethers are used for each finished air bag. The term "tether system" shall refer to a functional tether comprised of two or more joined tether segments, as is described herein.

Because of the speed with which an air bag inflates, it is necessary for the protection of vehicle occupants to control the volume of space that the air bag occupies in the vehicle cabin. Tethers accomplish this task by preventing the uncontrolled expansion of the air bag. Tethers are securely connected to the interior portions of the air bag, usually by sewing or other joining techniques.

Figure 1:
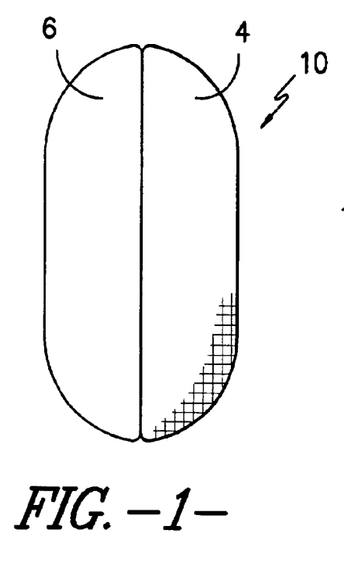
FIG. 1 shows a side view of an air bag comprised of a front panel and a rear panel.

FIG. 1 shows a side view of an air bag 10. Air bag 10 is comprised of a front bag panel 4 and a rear bag panel 6, panels 4 and 6 being substantially circular, although other panel geometries could also be used.

Figure 2:
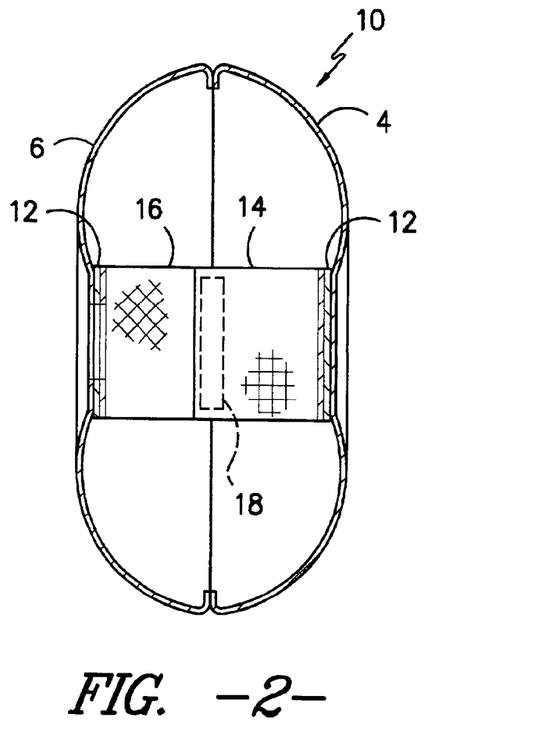
FIG. 2 shows a cross-sectional view of the air bag of FIG. 1, revealing a tether system incorporated therein.
Figure 3A:
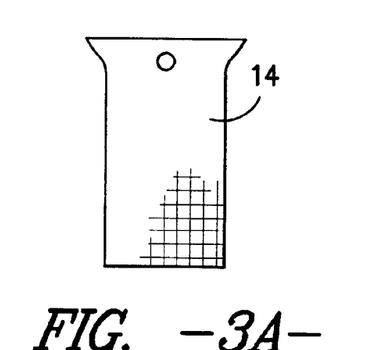
FIG. 3A shows a plan view of a tether segment of the present invention that cut in alignment with the warp and fill of a fabric blank.
Figure 3B:
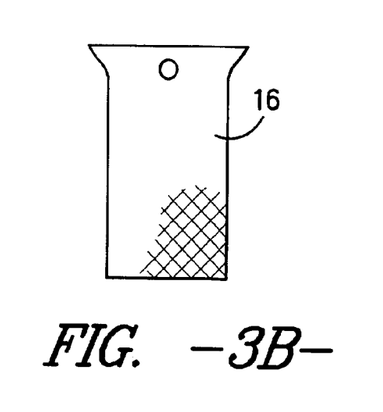
FIG. 3B shows a plan view of a tether segment of the present invention that is cut on the bias with respect to the warp and fill of a fabric blank.

FIG. 2 shows a cross-sectional view of air bag 10, revealing the arrangement of a tether system therein. Tether segment 14 (shown in FIG. 3A as being cut in alignment with the warp and fill of a fabric blank) is attached to front bag panel 4. Tether segment 16 (shown in FIG. 3B as being cut on the bias of a fabric blank) is attached to rear bag panel 6. Tether segments 14, 16 are shown in lapped fashion in the interior of air bag 10. The joining of tether segments 14, 16 is shown as being achieved by means of rectangular seam 18, but such joining may be accomplished by any other means, such as welding or other seaming techniques. Tether segments 14, 16 are substantially rectangular in shape, each having one flared end which is positioned toward the center of respective bag panels 4, 6.

Figure 3C:
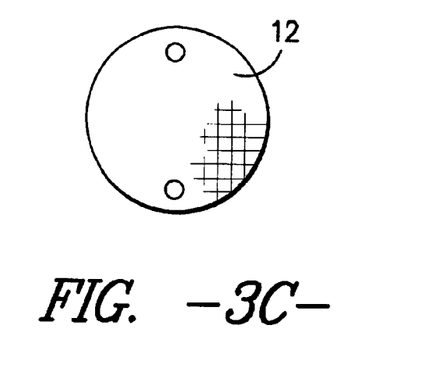
FIG. 3C shows a plan view of a circular reinforcement as may be included in the air bag tether system of the present invention.

Circular reinforcement 12 (shown in FIG. 3C) is also attached to front bag panel 4, as well as rear bag panel 6. It is common for reinforcements, having a circular or other shape, to be used in the production of air bags 10. Circular reinforcements 12 are included with tether segments 14, 16 to form front tether 24 and rear tether 26 respectively. Such reinforcements 12 are particularly important in preventing tears around the mouth of air bag 10, at the location of the inflation media.

Figures 3D, 3E:
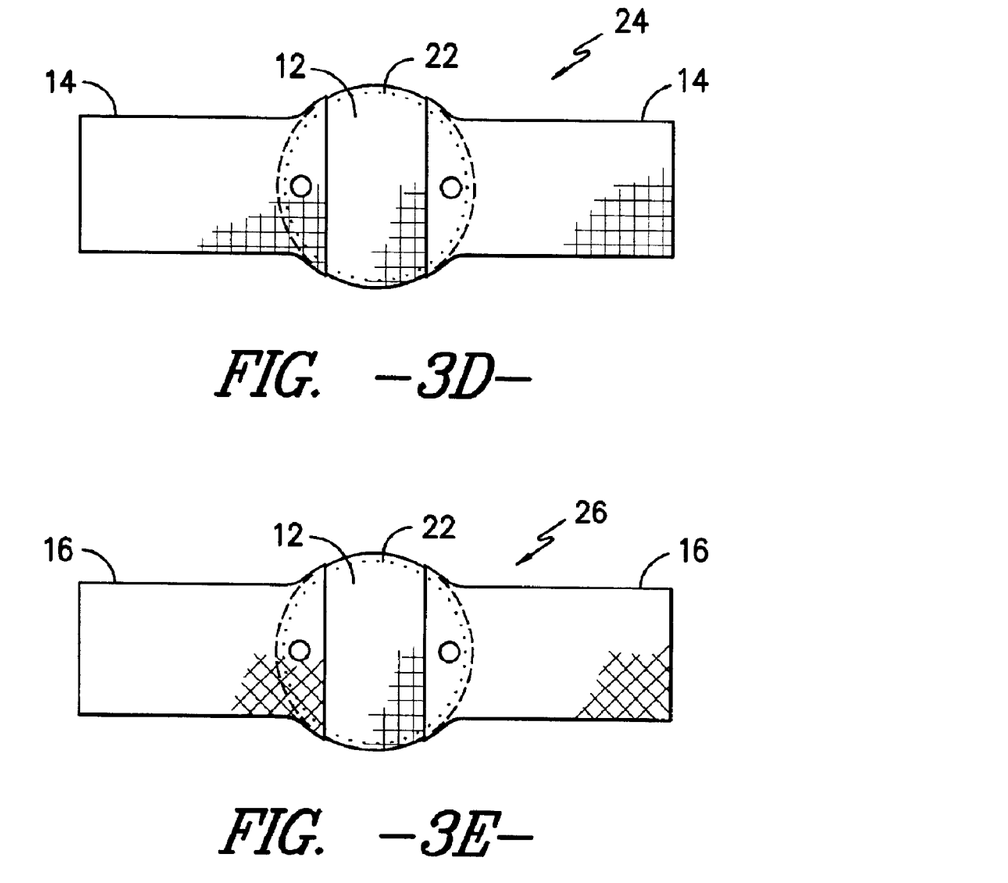
FIG. 3D shows a plan view of a multi-piece tether panel, as comprised of two of the tether segments of FIG. 3A and the circular reinforcement of FIG. 3C, which would be attached to the front panel of an air bag.
FIG. 3E shows a plan view of a multi-piece tether panel, as comprised of two of the tether segments of FIG. 3B and the circular reinforcement of FIG. 3C, which would be attached to the rear panel of an air bag.

Tether segment 14 is part of a multi-segment front tether 24 that is shown in FIG. 3D. Front tether 24 is comprised of two of tether segments 14 and circular reinforcement 12. Tether segments 14 and reinforcement 12 are secured to one another and to front bag panel 4 by seam 22, as indicated by a dotted line in FIG. 3D.

Tether segment 16 is part of a multi-segment rear tether 26 that is shown in FIG. 3E. Rear tether 26 is comprised of two of tether segments 16 and circular reinforcement 12. Tether segments 16 and reinforcement 12 are secured to one another and to rear bag panel 6 by seam 22, as indicated by a dotted line in FIG. 3E. It should be noted that tether segments 16 are cut on the bias with respect to the warp and the fill of a fabric blank. The angle of the bias cut should be in the range of 25 to 65 degrees. As stated above, it has been found that the portion of a tether that is connected to the rear of the air bag experiences the greatest stress and, as a result, needs the capacity to stretch to accommodate such stress. Rear tether 26 is capable of stretching to accommodate such stress, because tether segments 16 that comprise rear tether 26 are cut on the bias of the fabric.

Unlike tether segments 16, tether segments 14 are cut in alignment with the warp and the fill of the fabric. As a result, tether segments 14 are less capable of elongation than tether segments 16. However, this elongation difference has not been found to be problematic. Tether segments 16 contribute the majority of the elongation that is necessary for the entire tether system, and the fabric that is saved by utilizing such a multi-segment tether system reduces production costs significantly. In a preferred embodiment, tether segments 14 are attached to front bag panel 4 and bias-cut tether segments 16 are attached to rear bag panel 6. It is believed, however, that circumstances might arise in which it would be preferable for bias-cut tether segments 16 to be attached to front bag panel 4.

Figure 3F:
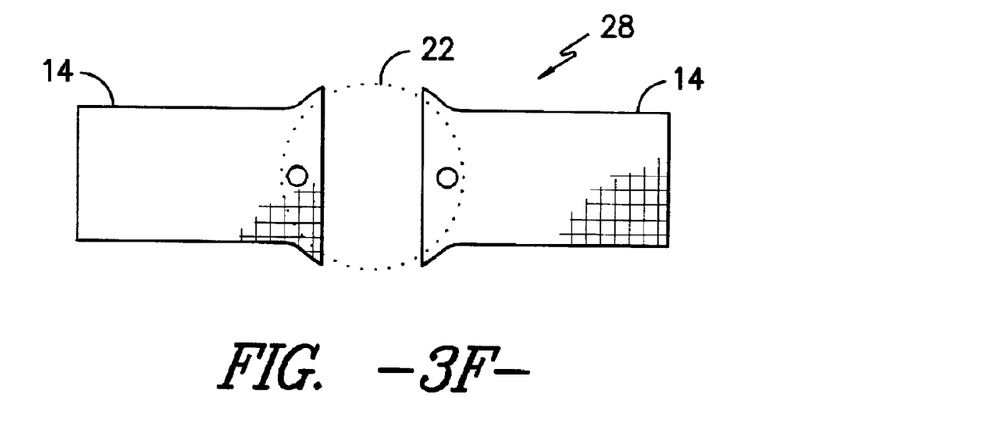
FIG. 3F shows a plan view of a multi-segment tether, in which two of the tether segments of FIG. 3A are attached to the front panel of an air bag by a circular seam, but without the inclusion of the circular reinforcement of FIG. 3C.

FIG. 3F shows a variation of front tether 24 of FIG. 3D. In this embodiment, circular reinforcement 12 is omitted. Tether segments 14 are attached to front bag panel 4 by means of seam 22. In this variation, tether segments 14 do not contact one another, but nevertheless act in cooperation with one another and bag panel 4 (not shown) to form front tether 28. Although not illustrated in the Figures, a similar tether could be constructed for use on rear bag panel 6, using tether segments 16.

Figure 4A:
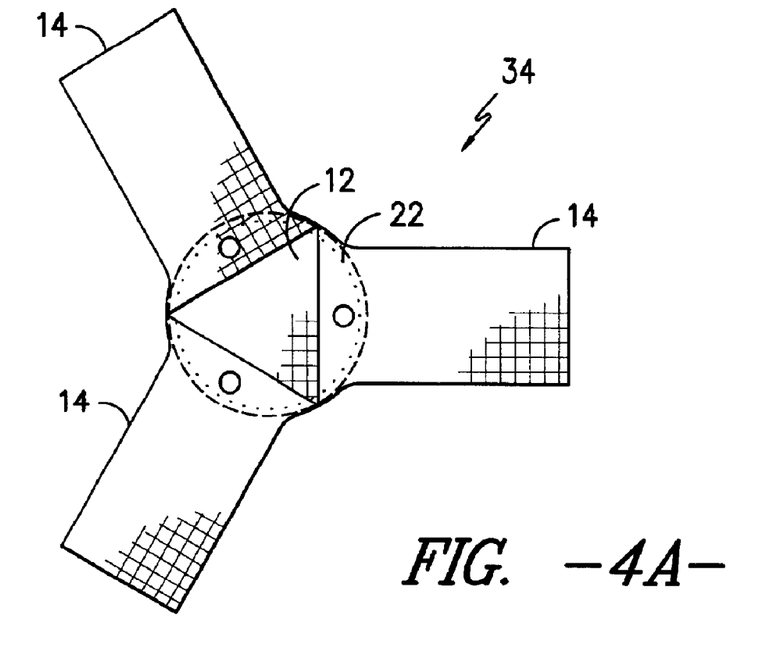
FIG. 4A shows a plan view of a multi-segment tether that is suitable for attachment to the front panel of an air bag and that is comprised of three of the tether segments of FIG. 3A and the circular reinforcement of FIG. 3C.
Figure 4B:
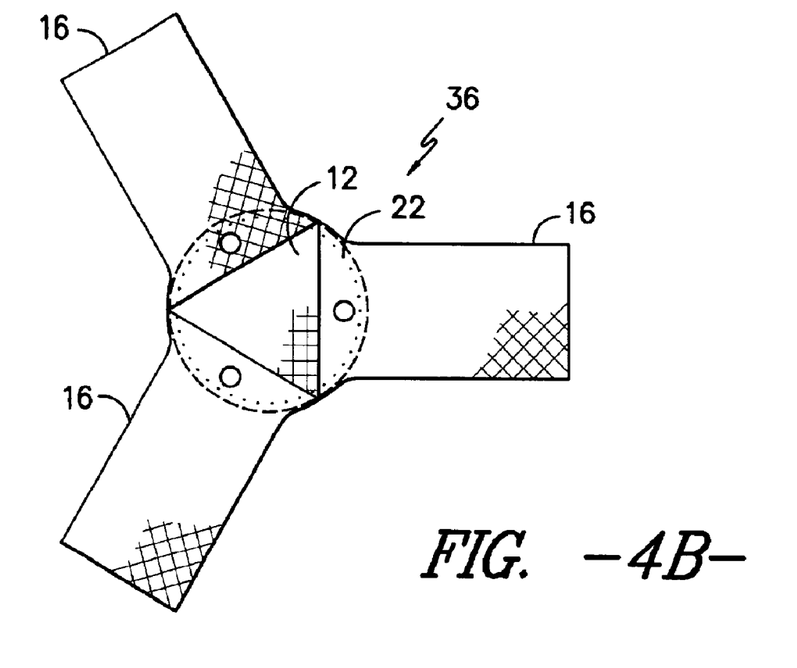
FIG. 4B shows a plan view a multi-segment tether that is suitable for attachment to the rear panel of an air bag and that is comprised of three of the tether segments of FIG. 3B and the circular reinforcement of FIG. 3C.

Turning now to FIG. 4A, a three-legged front tether 34 is shown. Three-legged front tether 34 is comprised of three tether segments 14 and circular reinforcement 12. Tether segments 14 and reinforcement 12 are secured to front bag panel 4 by means of seam 22. FIG. 4B illustrates a similar three-legged rear tether 36. Three-legged rear tether 36 is comprised of three bias-cut tether segments 16 and circular reinforcement 12. Seam 22 secures tether segments 16 and reinforcement 12 to rear bag panel 6. Three-legged tethers 34 and 36 are useful when for reducing bag oscillation during deployment.

Figure 5A:
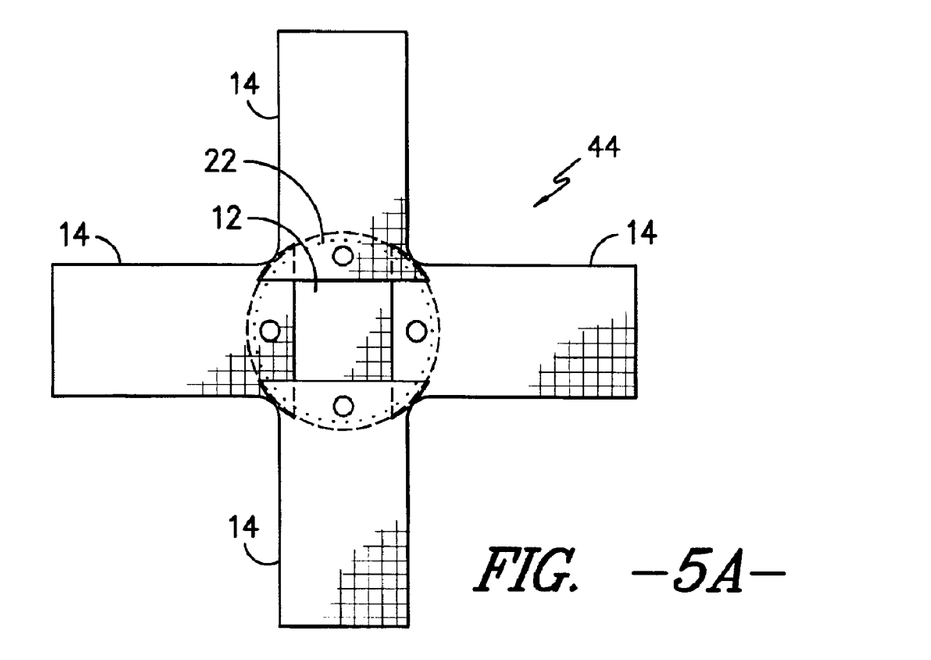
FIG. 5A shows a plan view of a multi-segment tether that is suitable for attachment to the front panel of an air bag and that is comprised of four of the tether segments of FIG. 3A and the circular reinforcement of FIG. 3C.
Figure 5B:
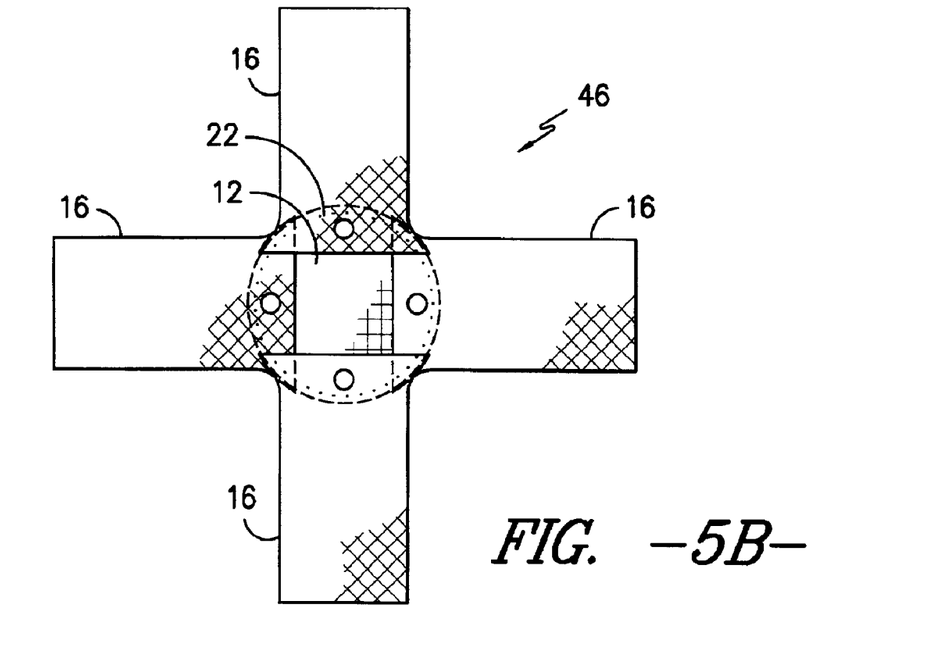
FIG. 5B shows a plan view of a multi-segment tether that is suitable for attachment to the rear panel of an air bag and that is comprised of four of the tether segments of FIG. 3B and the circular reinforcement of FIG. 3C.

FIG. 5A shows a four-legged front tether 44. Four-legged front tether 44 is comprised of four tether segments 16 and circular reinforcement 12. Seam 22 secures tether segments 16 and reinforcement 12 to front bag panel 4. FIG. 5B illustrates a similar four-legged rear tether 46. Four-legged rear tether 46 is comprised of four bias-cut tether segments 16 and circular reinforcement 12. Seam 22 secures tether segments 16 and reinforcement 12 to rear bag panel 6. Four-legged tethers 44 and 46 offer the added benefit of reduced oscillation during bag deployment.

Figure 6A:
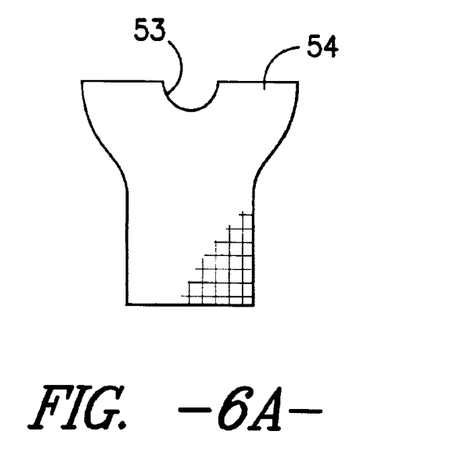
FIG. 6A shows a plan view of a tether segment of the present invention that is cut in alignment with the warp and fill of a fabric blank.

FIG. 6A shows a variation of tether segment 14. Front tether segment 54 has a widened end portion that eliminates the need for circular reinforcement 12. An arc 53 in the central portion of the widened end provides half of what will be an opening 55 in front tether 64 (see FIG. 6C). Opening 55 is useful for alignment of segments 54, 56. Seam 22 attaches tether segments 54 to front bag panel 4 to create front tether 64.

Figure 6B:
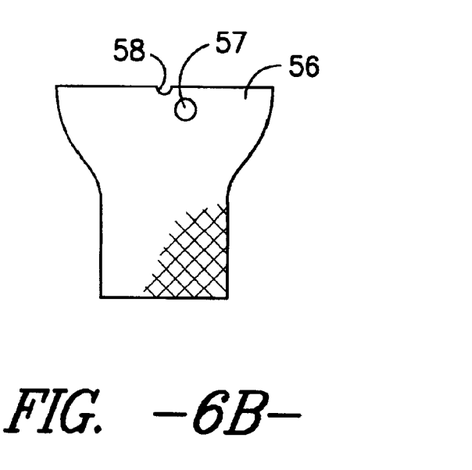
FIG. 6B shows a plan view of a tether segment of the present invention that is cut on the bias with respect to the warp and fill of a fabric blank.
Figure 6C:
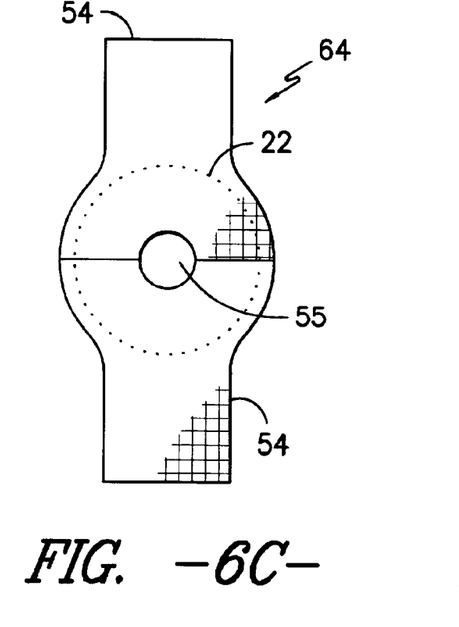
FIG. 6C shows a plan view of a multi-piece tether panel, as comprised of two of the tether segments of FIG. 6A, which would be attached to the front panel of an air bag.
Figure 6D:
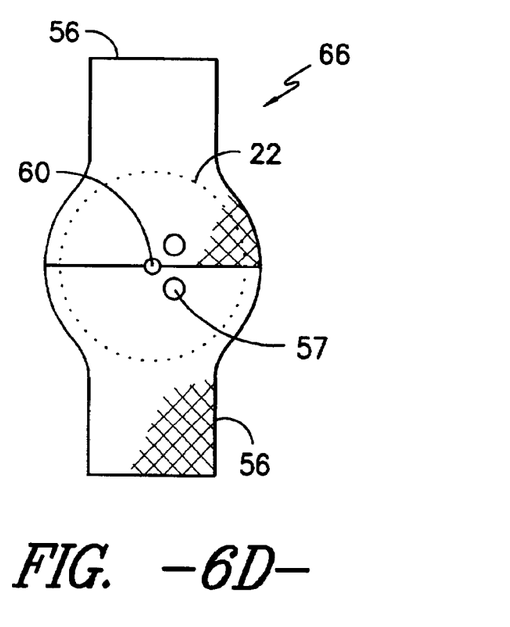
FIG. 6D shows a plan view of a multi-piece tether panel, as comprised of two of the tether segments of FIG. 6B, which would be attached to the rear panel of an air bag.

FIG. 6B shows a variation of tether segment 16. Rear tether segment 56 has a widened end and the shape of rear tether segment 56 is congruent to that of front tether segment 54. Rear tether segment 56 is cut on the bias with respect to the warp and fill of a fabric blank. Tether segment 56 has a small arc 58 in the central portion of the widened end, which provides half of what will be an opening 60 in rear tether 66 (see FIG. 6D). Opening 60 is used to insert inflation media into the air bag. Tether segment 56 also has a ventilation opening 57 that is also present in rear tether 66. Again, seam 22 creates tether 66 by securing tether segments 56 to rear bag panel 6. Circular reinforcement 12 is not necessary.

Figure 7A:
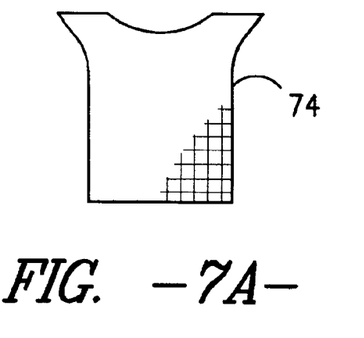
FIG. 7A shows a plan view of a tether segment of the present invention that is cut in alignment with the warp and fill of a fabric blank.

FIG. 7A shows yet another variation of tether segment 14. Tether segment 74 has an arced end portion and is slightly truncated in comparison to tether segment 14. Like tether segment 14, tether segment 74 also is cut in alignment with the warp and fill of a fabric blank and is suitable for attachment to front bag panel 4.

Figure 7B:
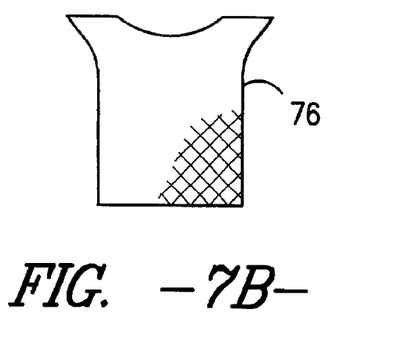
FIG. 7B shows a plan view of a tether segment of the present invention that is cut on the bias with respect to the warp and fill of a fabric blank.

FIG. 7B shows yet another variation of tether segment 16. Tether segment 76 has an arced end portion and is slightly truncated in comparison to tether segment 16. Tether segment 76 is congruent to tether segment 74. Like tether segment 16, tether segment 76 also is cut on the bias with respect to the warp and fill of a fabric blank and, for that reason, is suitable for attachment to rear bag panel 6.

Figure 7C:
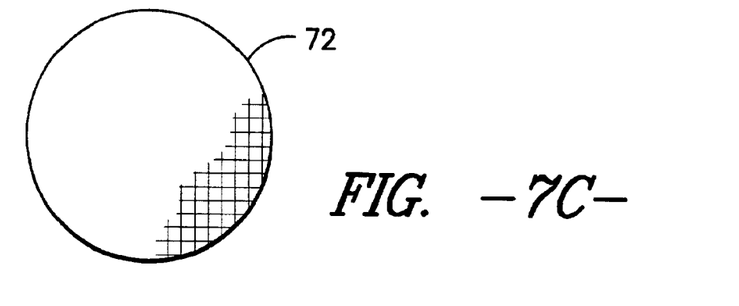
FIG. 7C shows a plan view of a circular reinforcement as may be included with the tether segments of FIG. 7A and FIG. 7B.
Figure 7D:
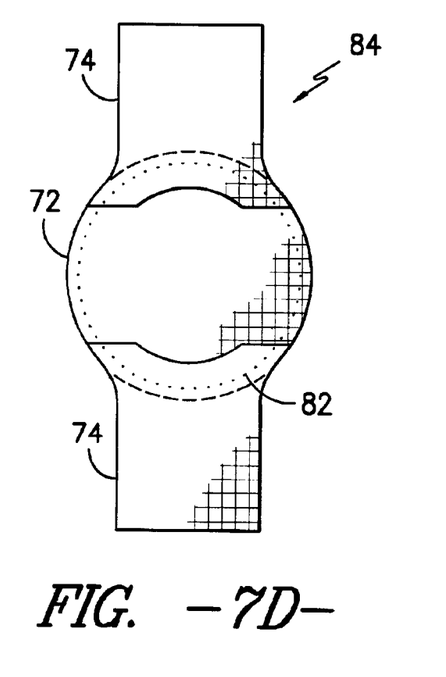
FIG. 7D shows a plan view of a multi-piece tether panel, as comprised of two of the tether segments of FIG. 7A and the circular reinforcement of FIG. 7C, which would be attached to the front panel of an air bag.
Figure 7E:
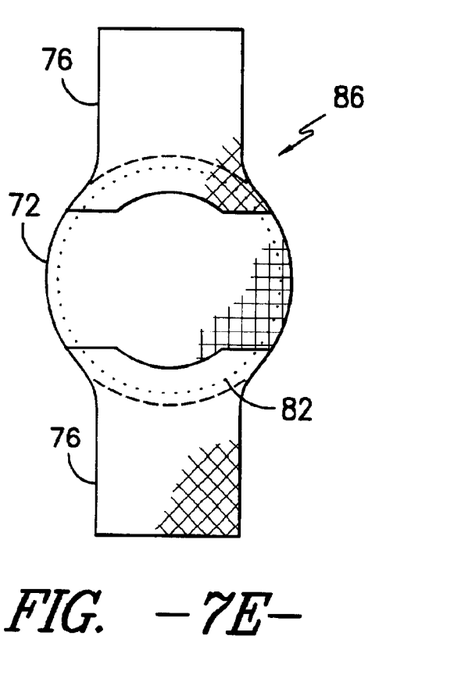
FIG. 7E shows a plan view of a multi-piece tether panel, as comprised of two of the tether segments of FIG. 7B and the circular reinforcement of FIG. 7C, which would be attached to the rear panel of an air bag.

FIG. 7C shows a circular reinforcement 72 as may be used with front tether segment 74 and rear tether segment 76. As illustrated in FIG. 7D, front tether 84 is comprised of two front tether segments 74 and circular reinforcement 72. Seam 82 secures tether segments 74 and reinforcement 72 to one another and to front bag panel 4. FIG. 7E illustrates rear tether 86, which is comprised of two rear tether segments 76 and circular reinforcement 72. Seam 82 secures tether segments 76 and reinforcement 72 to one another and to rear bag panel 6.

Figure 8:
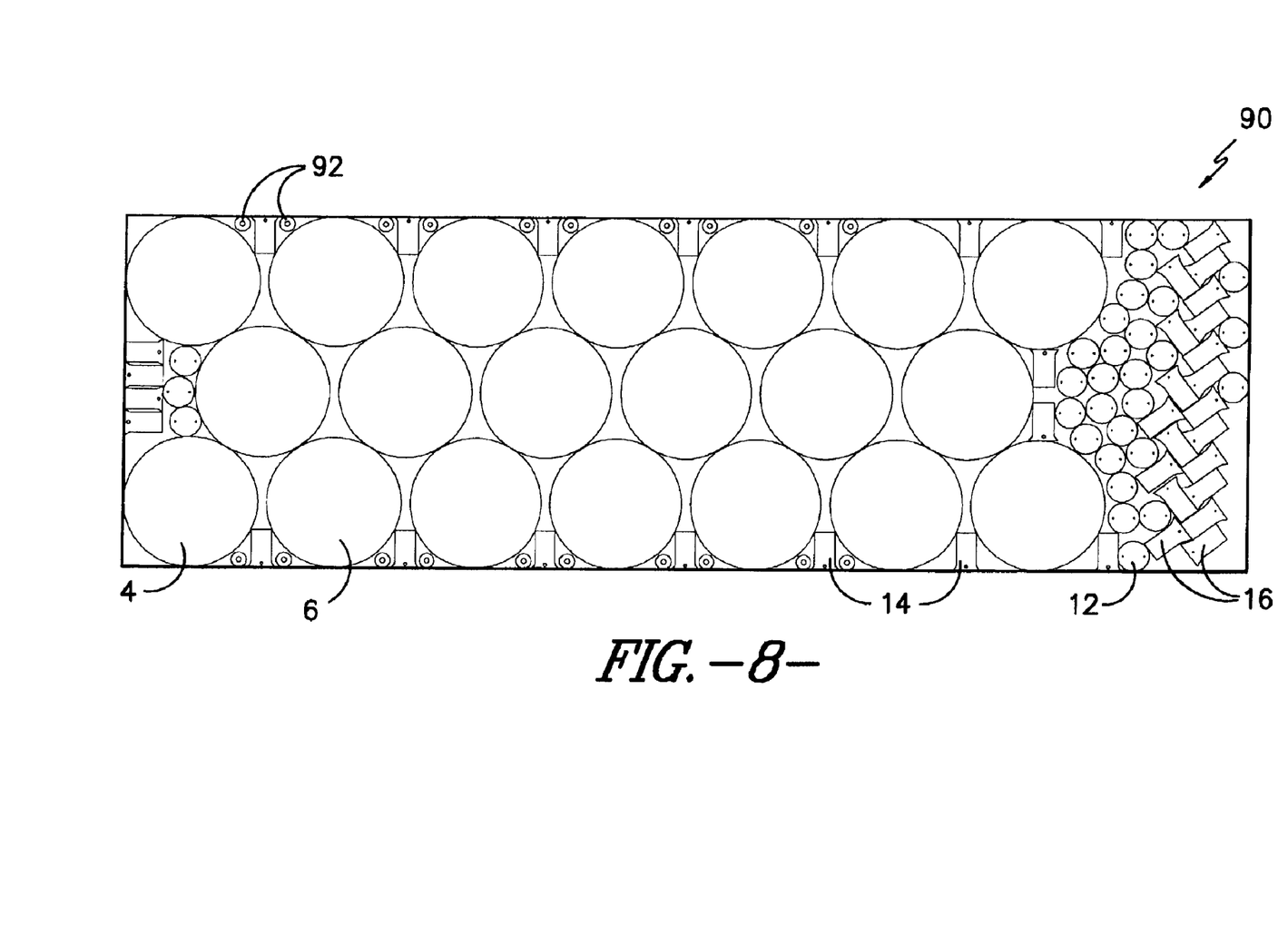
FIG. 8 shows a plan view of the arrangement of air bag panel components and the tether components of FIGS. 3A, 3B, and 3C on a fabric blank, in accordance with the teachings herein.

FIG. 8 illustrates an arrangement on a fabric blank 90 of air bag panels 4 and 6, tether segments 14 and 16, and reinforcements 12. Vent reinforcements 92, which support the fabric surrounding vent holes on rear bag panel 6, are also incorporated into the pattern-wise configuration of air bag components. The separation of the conventional tether into multiple tether segments 14, 16 allows a greater number of air bag components to be produced from a smaller length of fabric, by nesting tether segments 14, 16 between bag panels 4, 6 into areas that would otherwise be considered fabric waste. By way of example only, bag panels 4, 6 having a circular shape are illustrated. If tethers 14, 16 were formed in accordance with conventional thinking that the entirety of tethers 14, 16 must be cut on the bias, the amount of fabric blank 90 that would be required would be considerably greater than for the multi-piece tether system of the present invention. The requirement that each tether 14, 16 be cut on the bias (in order to achieve the desired elongation) would result in an increased amount of fabric utilized per finished air bag 10 and an increased amount of fabric waste.

The multi-segment tether system includes front tether 24 that is cut in alignment with the warp and fill of fabric blank 90 and rear tether 26 that is cut on the bias with respect to the warp and fill of fabric blank 90. Each tether 24, 26 is comprised of multiple tether segments 14, 16 respectively and may or may not include reinforcements 12 or 72. Alternate embodiments of front tether segments 14 are identified as tether segments 54 and 74, and alternate embodiments of bias-cut tether segments 16 are identified as tether segments 56 and 76. By incorporating these various multi-segment tether systems, the present invention addresses the issues of fabric utilization and tether elongation, thus representing a useful advancement over the prior art.

I claim:

1. A fabric blank comprising a textile fabric having wrap yarns and fill yarns from which a plurality of air bag panels, first tether segments, and second tether segment are cut, said air bag panels and said first and second tether seconds being arranged in a pattern-wise configuration, said first tether segments being cut in alignment with the warp and fill of said textile fabric, and second tether segments being cut on a bias with respect to the warp and fill said textile fabric.

2. The fabric blank of claim 1 wherein said first tether segments and said second tether segments are substantially rectangular in shape and are congruent.

3. The fabric blank of claim 1 wherein a plurality of circular reinforcements is included in said pattern-wise configuration and is cut from said fabric blank, said circular reinforcements having a diameter that is greater than the width of said first and second tether segments.

4. The fabric blank of claim 3 wherein a plurality of circular vent reinforcements is included in said pattern-wise configuration and is cut from said fabric blank, said vent reinforcements having a diameter that is less than the diameter of said circular reinforcements.

* * * * *